United States Patent
Luly et al.

(10) Patent No.: US 11,267,707 B2
(45) Date of Patent: Mar. 8, 2022

(54) PURIFICATION OF BIS(FLUOROSULFONYL) IMIDE

(71) Applicant: Honeywell International Inc., Morris Plains, NJ (US)

(72) Inventors: Matthew H. Luly, Hamburg, NY (US); Bernard E. Pointner, Buffalo, NY (US)

(73) Assignee: Honeywell International Inc, Charlotte, NC (US)

( * ) Notice: Subject to any disclaimer, the term of this patent is extended or adjusted under 35 U.S.C. 154(b) by 87 days.

(21) Appl. No.: 16/842,646

(22) Filed: Apr. 7, 2020

(65) Prior Publication Data

US 2020/0331754 A1 Oct. 22, 2020

Related U.S. Application Data

(60) Provisional application No. 62/834,815, filed on Apr. 16, 2019.

(51) Int. Cl.
*C01B 21/093* (2006.01)

(52) U.S. Cl.
CPC .................................. *C01B 21/093* (2013.01)

(58) Field of Classification Search
CPC ............................ C01B 21/086; C01B 21/093
See application file for complete search history.

(56) References Cited

U.S. PATENT DOCUMENTS

| 7,253,317 | B2 | 8/2007 | Cernik et al. |
| 8,039,660 | B2 | 10/2011 | Basset et al. |
| 8,134,027 | B2 | 3/2012 | Okumura et al. |
| 8,337,797 | B2 | 12/2012 | Honda et al. |
| 8,377,406 | B1 | 2/2013 | Singh et al. |
| 8,436,198 | B2 | 5/2013 | Honda et al. |
| 8,722,005 | B1 | 5/2014 | Poshusta et al. |
| 8,907,209 | B2 | 12/2014 | Saito |
| 8,936,674 | B2 | 1/2015 | Honda et al. |
| 8,940,444 | B2 | 1/2015 | Gennett et al. |
| 9,005,820 | B2 | 4/2015 | Sugimoto et al. |
| 9,156,692 | B2 | 10/2015 | Honda et al. |
| 9,214,697 | B2 | 12/2015 | Kashima et al. |
| 9,225,037 | B2 | 12/2015 | Sugimoto et al. |
| 9,231,269 | B2 | 1/2016 | Nakanishi |
| 9,242,862 | B2 | 1/2016 | Tsubokura et al. |
| 9,252,459 | B2 | 2/2016 | Itakura et al. |
| 9,284,268 | B2 | 3/2016 | Poshusta et al. |
| 9,343,787 | B2 | 5/2016 | Takechi et al. |
| 9,394,172 | B2 | 7/2016 | Schmidt |
| 9,475,764 | B2 | 10/2016 | Johnson |
| 9,546,136 | B2 | 1/2017 | Schnider et al. |
| 9,611,378 | B2 | 4/2017 | Ishizaki et al. |
| 9,627,727 | B2 | 4/2017 | Takechi et al. |
| 9,666,916 | B2 | 5/2017 | Mizuno et al. |
| 9,725,318 | B2 | 8/2017 | Audureau et al. |
| 9,742,030 | B2 | 8/2017 | Wright et al. |
| 9,768,469 | B2 | 9/2017 | Kim et al. |
| 9,799,881 | B2 | 10/2017 | Sankarasubramanian et al. |
| 10,734,664 | B1 * | 8/2020 | Singh ................ H01M 10/0565 |
| 2007/0043231 | A1 | 2/2007 | Hammami et al. |
| 2009/0117020 | A1 | 5/2009 | Manthiram et al. |
| 2009/0169992 | A1 | 7/2009 | Ishiko et al. |
| 2009/0270286 | A1 | 10/2009 | Kawata et al. |
| 2009/0289213 | A1 * | 11/2009 | Pipper ...................... C07K 1/22 |
| | | | 252/62.51 R |
| 2010/0178555 | A1 | 7/2010 | Best |
| 2010/0222586 | A1 | 9/2010 | Pleschke et al. |
| 2011/0171105 | A1 * | 7/2011 | Sevier .................... B01D 53/62 |
| | | | 423/420 |
| 2012/0009113 | A1 | 1/2012 | Honda et al. |
| 2012/0041233 | A1 | 2/2012 | Sato et al. |
| 2012/0193587 | A1 | 8/2012 | Sakuraba et al. |
| 2012/0245386 | A1 | 9/2012 | Johnson |
| 2013/0106029 | A1 | 5/2013 | Snyder et al. |
| 2013/0137899 | A1 | 5/2013 | Honda et al. |
| 2013/0202973 | A1 | 8/2013 | Lane et al. |
| 2013/0252096 | A1 | 9/2013 | Kobayakawa et al. |
| 2013/0330608 | A1 | 12/2013 | Nitta et al. |
| 2015/0093655 | A1 | 4/2015 | Kozelj et al. |
| 2015/0140421 | A1 | 5/2015 | Ihara et al. |
| 2016/0149262 | A1 | 5/2016 | Singh et al. |
| 2016/0233487 | A1 | 8/2016 | Jun et al. |
| 2016/0304347 | A1 | 10/2016 | Buisine et al. |

(Continued)

FOREIGN PATENT DOCUMENTS

| CN | 102532866 A | 7/2012 |
| CN | 104495767 A | 4/2015 |

(Continued)

OTHER PUBLICATIONS

International Search Report and Written Opinion received for PCT Patent Application No. PCT/US2020/028068, dated Jul. 29, 2020, 11 pages.

*Primary Examiner* — Ngoc-Yen Nguyen

(74) *Attorney, Agent, or Firm* — Faegre Drinker Biddle & Reath LLP

(57) ABSTRACT

A method of producing purified bis(fluorosulfonyl) imide includes providing a liquid mixture including bis(fluorosulfonyl) imide and fluorosulfonic acid and then contacting the liquid mixture with gaseous ammonia. The gaseous ammonia reacts with the fluorosulfonic acid to produce ammonium fluorosulfate. The method further includes separating the liquid mixture from the ammonium fluorosulfate.

20 Claims, 3 Drawing Sheets

(56) References Cited

U.S. PATENT DOCUMENTS

| | | |
|---|---|---|
| 2016/0308247 A1 | 10/2016 | Buisine |
| 2017/0040632 A1 | 2/2017 | Ogata et al. |
| 2017/0047607 A1 | 2/2017 | Schmidt et al. |
| 2017/0075253 A1 | 3/2017 | Ito et al. |
| 2017/0077557 A1 | 3/2017 | Zheng et al. |
| 2017/0084923 A1 | 3/2017 | Oh et al. |
| 2017/0133711 A1 | 5/2017 | Gaben |
| 2017/0141432 A1 | 5/2017 | Chen et al. |
| 2017/0162911 A1 | 6/2017 | Gaben |
| 2017/0183230 A1 | 6/2017 | Poshusta et al. |
| 2017/0187070 A1 | 6/2017 | Park et al. |
| 2017/0194633 A1 | 7/2017 | Schumann et al. |
| 2017/0204124 A1 | 7/2017 | Takahashi et al. |
| 2017/0288281 A1 | 10/2017 | Chiang et al. |
| 2017/0294681 A1 | 10/2017 | Burshtain et al. |
| 2017/0324086 A1 | 11/2017 | Nitta et al. |

FOREIGN PATENT DOCUMENTS

| | | |
|---|---|---|
| CN | 104671224 A | 6/2015 |
| CN | 104961110 A | 10/2015 |
| CN | 105731398 A | 7/2016 |
| CN | 105858626 A | 8/2016 |
| CN | 106006586 A | 10/2016 |
| CN | 106044728 A | 10/2016 |
| CN | 106219503 A | 12/2016 |
| CN | 106241757 A | 12/2016 |
| CN | 106276829 A | 1/2017 |
| CN | 106315623 A | 1/2017 |
| CN | 106365132 A | 2/2017 |
| CN | 107055493 A | 8/2017 |
| CN | 107215853 A | 9/2017 |
| CN | 107416782 A | 12/2017 |
| EP | 2415709 A1 | 2/2012 |
| EP | 2883881 A1 | 6/2015 |
| EP | 2952518 A1 | 12/2015 |
| EP | 3090984 A1 | 11/2016 |
| JP | 2005-187629 A | 7/2005 |
| JP | 2008-257963 A | 10/2008 |
| JP | 2009-137901 A | 6/2009 |
| JP | 2009-277413 A | 11/2009 |
| JP | 2012-162470 A | 8/2012 |
| JP | 5006573 B2 | 8/2012 |
| JP | 5160159 B2 | 3/2013 |
| JP | 5187808 B2 | 4/2013 |
| JP | 5191931 B2 | 5/2013 |
| JP | 2013-197061 A | 9/2013 |
| JP | 5305312 B2 | 10/2013 |
| JP | 5305313 B2 | 10/2013 |
| JP | 2014-005388 A | 1/2014 |
| JP | 5401336 B2 | 1/2014 |
| JP | 2014-105115 A | 6/2014 |
| JP | 5508905 B2 | 6/2014 |
| JP | 2014-137938 A | 7/2014 |
| JP | 5560136 B2 | 7/2014 |
| JP | 2014-162680 A | 9/2014 |
| JP | 2015-051805 A | 3/2015 |
| JP | 5701552 B2 | 4/2015 |
| JP | 2015-118745 A | 6/2015 |
| JP | 5726707 B2 | 6/2015 |
| JP | 5728710 B2 | 6/2015 |
| JP | 2016-038945 A | 3/2016 |
| JP | 2016-038946 A | 3/2016 |
| JP | 5886606 B2 | 3/2016 |
| JP | 2016-069277 A | 5/2016 |
| JP | 2016-079237 A | 5/2016 |
| JP | 2016-080784 A | 5/2016 |
| JP | 2016-088809 A | 5/2016 |
| JP | 5930290 B2 | 6/2016 |
| JP | 5940443 B2 | 6/2016 |
| JP | 2016-124735 A | 7/2016 |
| JP | 2016-145147 A | 8/2016 |
| JP | 2016-160268 A | 9/2016 |
| JP | 2016-164214 A | 9/2016 |
| JP | 2016-172808 A | 9/2016 |
| JP | 2016-192435 A | 11/2016 |
| JP | 6027307 B2 | 11/2016 |
| JP | 2017-041425 A | 2/2017 |
| JP | 2017-041426 A | 2/2017 |
| JP | 2017-057328 A | 3/2017 |
| JP | 2017-069164 A | 4/2017 |
| JP | 2017-073251 A | 4/2017 |
| JP | 2017-091813 A | 5/2017 |
| JP | 2017-126542 A | 7/2017 |
| JP | 6205451 B2 | 9/2017 |
| JP | 6206070 B2 | 10/2017 |
| JP | 6208929 B2 | 10/2017 |
| KR | 10-2010-0018765 A | 2/2010 |
| KR | 10-2017-0030116 A | 3/2017 |
| KR | 10-1727948 B1 | 4/2017 |
| KR | 2017-0083368 A | 7/2017 |
| WO | 2000/077057 A2 | 12/2000 |
| WO | 2009/084651 A1 | 7/2009 |
| WO | 2010/010613 A1 | 1/2010 |
| WO | 2010/097922 A1 | 9/2010 |
| WO | 2010/143643 A1 | 12/2010 |
| WO | 2011/037060 A1 | 3/2011 |
| WO | 2011/111780 A1 | 9/2011 |
| WO | 2011/148971 A1 | 12/2011 |
| WO | 2012/026360 A1 | 3/2012 |
| WO | 2012/036039 A1 | 3/2012 |
| WO | 2012/165483 A1 | 12/2012 |
| WO | 2013/065534 A1 | 5/2013 |
| WO | 2014/036814 A1 | 3/2014 |
| WO | 2014/051057 A1 | 4/2014 |
| WO | 2014/170979 A1 | 10/2014 |
| WO | 2015/143866 A1 | 10/2015 |
| WO | 2016/004189 A1 | 1/2016 |
| WO | 2016/059926 A1 | 4/2016 |
| WO | 2016/143675 A1 | 9/2016 |
| WO | 2016/177765 A1 | 11/2016 |
| WO | 2016/184176 A1 | 11/2016 |
| WO | 2016/189250 A1 | 12/2016 |
| WO | 2016/204278 A1 | 12/2016 |
| WO | 2016/208607 A1 | 12/2016 |
| WO | 2017/030811 A1 | 2/2017 |
| WO | 2017/047019 A1 | 3/2017 |
| WO | 2017/049471 A1 | 3/2017 |
| WO | 2017/064918 A1 | 4/2017 |
| WO | 2017/065145 A1 | 4/2017 |
| WO | 2017/066810 A1 | 4/2017 |
| WO | 2017/080831 A1 | 5/2017 |
| WO | 2017/090231 A1 | 6/2017 |
| WO | 2017/111143 A1 | 6/2017 |
| WO | 2017/126851 A1 | 7/2017 |
| WO | 2017/204225 A1 | 11/2017 |
| WO | 2017/204302 A1 | 11/2017 |
| WO | 2017/204303 A1 | 11/2017 |

* cited by examiner

PURIFICATION OF BIS(FLUOROSULFONYL) IMIDE

CROSS REFERENCE TO RELATED APPLICATION

This application claims priority to Provisional Application No. 62/834,815, filed Apr. 16, 2019, which is herein incorporated by reference in its entirety.

FIELD

The present disclosure is related to a method of removing fluorosulfonic acid from a liquid mixture of fluorosulfonic acid and bis(fluorosulfonyl) imide.

BACKGROUND

Bis(fluorosulfonyl) imide (HFSI) is a key raw material in the production of lithium bis(fluorosulfonyl) imide (LiFSI), which is used in lithium ion batteries. HFSI can be prepared by several methods. For example, HFSI can be prepared by the reaction of urea with fluorosulfonic acid shown in Equation 1:

$$5HSO_3F + 2CO(NH_2)_2 \rightarrow HN(SO_2F)_2 + 2CO_2 + 3NH_4SO_3F. \qquad \text{Eq. 1}$$

In another example, HFSI can be prepared by the reaction of fluorosulfuryl isocyanate with fluorosulfonic acid shown in Equation 2:

$$HSO_3F + FSO_2NCO \; HN(SO_2F)_2 + CO_2. \qquad \text{Eq. 2}$$

In the reactions of Equations 1 and 2, as well as other reactions to prepare HFSI, the HFSI is often contaminated with excess fluorosulfonic acid. HFSI and fluorosulfonic acid boil at 170° C. and 165° C. respectively, thus making purification by distillation both difficult and expensive due to the column required to separate the two species. An improved method to remove fluorosulfonic acid from HFSI is needed to supply high purity HFSI for use as a raw material in the production of lithium bis(fluorosulfonyl) imide.

SUMMARY

The present disclosure provides processes for producing purified bis(fluorosulfonyl) imide using gaseous ammonia.

In one form thereof, the present disclosure provides a method of producing purified bis(fluorosulfonyl) imide. The method includes providing a liquid mixture including bis(fluorosulfonyl) imide and fluorosulfonic acid and then contacting the liquid mixture with gaseous ammonia. The gaseous ammonia reacts with the fluorosulfonic acid to produce ammonium fluorosulfate. The method further includes separating the liquid mixture from the ammonium fluorosulfate.

DETAILED DESCRIPTION

Figure 1:
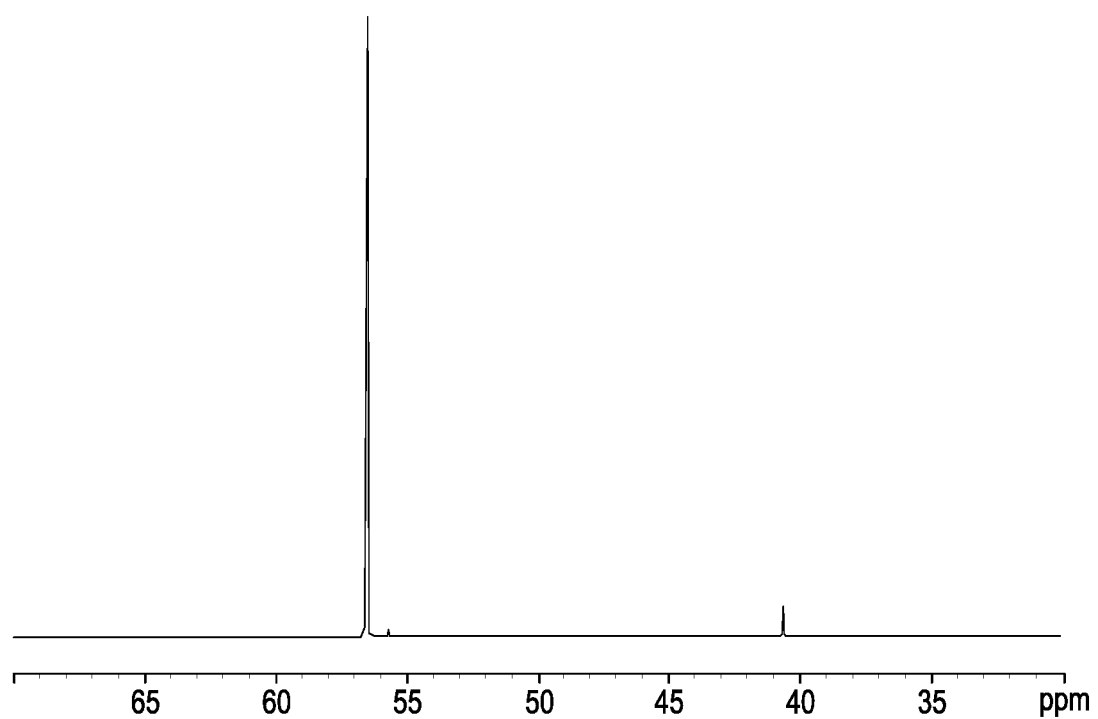
FIG. 1 shown a $^{19}F$ NMR spectrum of crude HFSI.

The present disclosure provides a method of removing fluorosulfonic acid from a liquid mixture including fluorosulfonic acid and bis(fluorosulfonyl) imide (HFSI) to purify the HFSI. It has been found that ammonia can be used to easily and inexpensively separate fluorosulfonic acid from HFSI. In the presence of HFSI, ammonia reacts preferentially with the fluorosulfonic acid according to Equation 3 to produce ammonium fluorosulfate:

$$NH_3 + HSO_3F \; NH_4SO_3F. \qquad \text{Eq. 3:}$$

Importantly, in some cases, such as when HFSI is prepared by the reaction of urea with fluorosulfonic acid as shown in Equation 1, the purification process does not introduce any new by-products into the product stream, as ammonium fluorosulfate is already produced in the synthesis of HFSI according to Equation 1.

A concentration of fluorosulfonic acid in the liquid mixture including HFSI and fluorosulfonic acid before purification may be as low as about 0.001 mole percent (mol %), about 0.002 mol %, about 0.005 mol %, about 0.01 mol. %, about 0.02 mol %, about 0.05 mol %, about 0.1 mol %, about 0.2 mol %, about 0.5 mol %, about 1 mol. %, about 2 mol %, about 5 mol %, or about 10 mol %, or as high as about 15 mol %, 20 mol %, about 25 mol. %, about 30 mol %, about 35 mol. %, about 40 mol %, about 45 mol. %, about 50 mol %, about 55 mol. %, about 60 mol %, about 65 mol. %, or about 70 mol %, or within any range defined between any two of the foregoing values, such as about 0.001 mol % to about 70 mol %, about 0.002 mol % to about 65 mol %, about 0.005 mol % to about 60 mol %, about 0.01 mol % to about 55 mol %. about 0.02 mol %, to about 50 mol %, about 0.05 mol % to about 45 mol %, about 0.1 mol % to about 40 mol %, about 0.2 mol % to about 35 mol %, about 0.5 mol % to about 30 mol %, about 1 mol % to about 25 mol %, about 2 mol % to about 20 mol %, about 5 mol % to about 15 mol %, about 0.5 mol % to about 50 mol %, about 1 mol % to about 40 mol %, about 2 mol % to about 30 mol %, about 5 mol % to about 20 mol %, about 1 mol % to about 10 mol %, or about 0.1 mol % to about 20 mol %, for example.

Removing the fluorosulfonic acid from the HFSI includes contacting the liquid mixture including HFSI and fluorosulfonic acid with gaseous ammonia, so that the gaseous ammonia reacts with the fluorosulfonic acid to produce ammonium fluorosulfate, as shown in Equation 3. Contacting the liquid mixture with the gaseous ammonia may include introducing the gaseous ammonia into the headspace of a vessel containing the liquid mixture and, optionally, agitating the mixture. As the ammonia reacts with the fluorosulfonic acid, the pressure in the vessel will decrease. Substantial completion of the reaction is indicated when the pressure in the vessel no longer decreases. The temperature of the reaction is not critical.

Alternatively, or additionally, contacting the liquid mixture with the gaseous ammonia may include bubbling the gaseous ammonia through the liquid mixture. Alternatively, or additionally, contacting the liquid mixture with the gaseous ammonia may include flowing the liquid mixture and the gaseous ammonia through counterflow column.

The gaseous ammonia may be supplied to the reaction at an absolute pressure as low as about 100 kilopascals (kPa), about 110 kPa, about 120 kPa, about 130 kPa, or about 140 kPa, or as high as about 150 kPa, about 160 kPa, about 170 kPa, about 180 kPa, about 190 kPa, or about 200 kPa, or within any range defined between any two of the foregoing values, such as about 100 kPa to about 200 kPa, about 110 kPa to about 190 kPa, about 120 kPa to about 180 kPa, about 130 kPa to about 170 kPa, about 140 kPa to about 160 kPa, about 140 kPa to about 150 kPa, or about 150 kPa to about 160 kPa, for example, for example.

Separating the liquid mixture from the ammonium fluorosulfate may include filtering the solid ammonium fluorosulfate from the liquid mixture. Alternatively, or additionally, separating the liquid mixture from the ammonium fluorosulfate may include spray drying the solid ammonium fluorosulfate from the liquid mixture. Alternatively, or additionally, separating the liquid mixture from the ammonium fluorosulfate may include flash distilling the HFSI from the ammonium fluorosulfate, leaving behind the solid ammonium fluorosulfate.

A concentration of HFSI in the liquid mixture after separating the ammonium fluorosulfate from the liquid mixture may be as low as about 90 mol %, about 92 mol %, about 94 mol %, about 95 mol %, about 96 mol %, or about 97 mol %, or as high as about 98 mol %, about 98.5 mol %, about 99 mol %, about 99.5 mol %, about 99.7 mol %, or about 99.9 mol %, or within any range defined between any two of the foregoing values, such as about 90 mol % to about 99.9 mol %, about 92 mol % to about 99.7 mol %, about 94 mol % to about 99.5 mol %, about 95 mol % to about 99 mol %, about 96 mol % to about 98.5 mol %, about 97 mol % to about 98 mol %, or about 98.5 mol % to about 99.9 mol %, for example.

Optionally, the process of contacting the liquid mixture including HFSI and fluorosulfonic acid with gaseous ammonia, and then separating the liquid mixture from the ammonium fluorosulfate, as described above, may be repeated as many times as necessary to eliminate residual fluorosulfonic acid and separate additional ammonium fluorosulfate to further purify the HFSI.

A concentration of residual fluorosulfonic acid in the liquid mixture including HFSI and fluorosulfonic acid before repeating the process may be as low as about 0.005 mole percent (mol %), about 0.007 mol %, about 0.01 mol %, about 0.02 mol %, about 0.03 mol %, about 0.04 mole %, about 0.5 mol %, about 0.06 mol %, about 0.08 mol %, about 0.1 mol %, about 0.15 mol % or about 0.2 mol. %, or as high as about 0.3 mol %, about 0.5 mol %, about 1 mol %, about 1.5 mol %, about 2 mol %, about 3 mol %, about 5 mol %, about 10 mol %, about 15 mol % or about 20 mol %, or within any range defined between any two of the foregoing values, such as about 0.005 mol % to about 20 mol %, about 0.007 mol % to about 15 mol %, about 0.01 mol % to about 10 mol %, about 0.02 mol % to about 5 mol %, about 0.03 mol % to about 3 mol %, about 0.04 mol % to about 2 mol %, about 0.05 mol % to about 1.5 mol %, about 0.06 mol % to about 1 mol %, about 0.08 mol % to about 0.5 mol %, about 0.1 mol % to about 0.3 mol %, about 0.15 mol % to about 0.2 mol %, or about 0.1 mol % to about 2 mol %, for example.

A concentration of HFSI in the liquid mixture after separating the additional ammonium fluorosulfate from the liquid mixture may be as low as about 95 mol %, about 96 mol %, or about 97 mol %, about 98 mol %, or about 98.5 mol %, or as high as about 99 mol %, about 99.5 mol %, about 99.7 mol %, about 99.9 mol %, or about 99.95 mol %, or within any range defined between any two of the foregoing values, such as about 95 mol % to about 99.95 mol %, about 96 mol % to about 99.9 mol %, about 97 mol % to about 99.7 mol %, about 98 mol % to about 99.5 mol %, about 98.5 mol % to about 99 mol %, or about 98.5 mol % to about 99.95 mol %, for example.

The methods described herein are much more energy and capital efficient in comparison to processes known in the art that rely exclusively upon distillation to remove fluorosulfonic acid from HFSI. Furthermore, the method described herein does not introduce any additional water or organic solvent into the system, unlike processes known in the art. Thus, the instant invention represents a significant improvement in the removal of fluorosulfonic acid from HFSI over processes known in the art.

In some embodiments, the process may include distilling the liquid mixture including the fluorosulfonic acid and the HFSI before providing the liquid mixture for purification according to the processes described above. The energy and capital cost to remove fluorosulfonic acid from HFSI by distillation is significantly reduced if the distillation process need only produce moderately pure HFSI, relying instead on the methods described herein to further purify the HFSI to the desired quality.

A concentration of fluorosulfonic acid in the liquid mixture including HFSI and fluorosulfonic acid after distillation and before purification may be as low as about 0.1 mol %, about 0.5 mol %, about 1 mol %, about 2 mol %, about 4 mol %, or about 6 mol %, or as high as about 8 mol %, about 10 mol %, about 15 mol %, or about 20 mol %, or within any range defined between any two of the foregoing values, such as about 0.1 mol % to about 20 mol %, about 2 mol % to about 15 mol %, about 4 mol % to about 10 mol %, about 6 mol % to about 8 mol %, or about 8 mol % to about 10 mol %, for example.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value. As used herein, the singular forms "a", "an" and "the" include plural unless the context clearly dictates otherwise.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

EXAMPLES

Example 1—Removal of Fluorosulfonic Acid from HFSI with Ammonia

In this Example, the purification of a mixture of HFSI and fluorosulfonic acid with gaseous ammonia as described above is demonstrated. A starting mixture of HFSI and fluorosulfonic acid was analyzed by Fluorine-19 nuclear magnetic resonance spectroscopy and found to include about 92.6 mol % HFSI and about 7.4 mol % fluorosulfonic acid. The $^{19}$F NMR spectrum is shown in FIG. 1. The mixture was purified by introducing gaseous ammonia at an absolute pressure between about 130 kPa and about 150 kPa into the headspace of a flask including the mixture of HFSI and fluorosulfonic acid. The contents of the flask was stirred using a Teflon™-coated magnetic stir bar. The flask sat at room temperature as the pressure was monitored. The reaction was observed to be exothermic as the flask would warm depending on the amount of fluorosulfonic acid present. After the pressure was observed to decrease to a residual pressure of less than about 3 kPa and the flask cooled to ambient, another charge of gaseous ammonia was introduced into the headspace of the flask and the contents stirred while the pressure was monitored. The process of recharging the headspace with gaseous ammonia and stirring was repeated until the pressure stabilized well above the residual pressure level, indicating that the reaction was substantially complete. The mixture in the flask was flash distilled and a first distillate was recovered. The first distillate was a clear, colorless liquid. A solid white powder remaining in the flask was analyzed by infrared spectroscopy and confirmed to be ammonium fluorosulfate.

Figure 2:
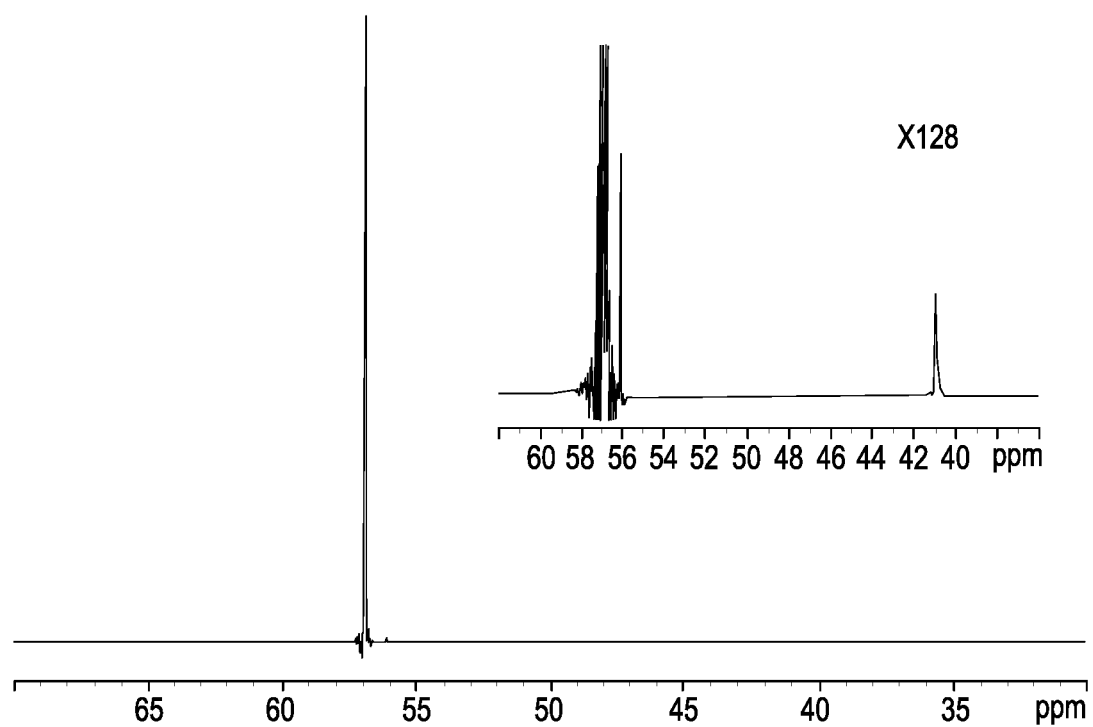
FIG. 2 illustrates a $^{19}F$ NMR spectrum including a portion of the spectrum magnified 128 times of the purified HFSI following a first treatment of the crude HFSI of FIG. 1 with ammonia, according to the present disclosure.

The first distillate was analyzed by Fluorine-19 nuclear magnetic resonance spectroscopy and found to include about 98.8 mol % HFSI and about 1.2 mol % fluorosulfonic acid. FIG. 2 shows the $^{19}$F NMR spectrum, as well as an inset portion of the spectrum magnified 128 times to be able to accurately see the peak indicative of fluorosulfonic acid. The first distillate was purified by introducing gaseous ammonia at an absolute pressure between about 130 kPa and about 150 kPa into the headspace of a flask including the first distillate. The contents of the flask was stirred using a Teflon™-coated magnetic stir bar. The flask sat at room temperature as the pressure was monitored. After the pressure was observed to decrease to a residual pressure of less than about 3 kPa and the flask cooled to ambient, another charge of gaseous ammonia was introduced into the headspace of the flask and the contents stirred while the pressure was monitored. The process of recharging the headspace with gaseous ammonia and stirring was repeated until the pressure stabilized well above the residual pressure level, indicating that the reaction was substantially complete. The first distillate in the flask was flash distilled and a second distillate recovered. The second distillate was a clear, colorless liquid.

Figure 3:
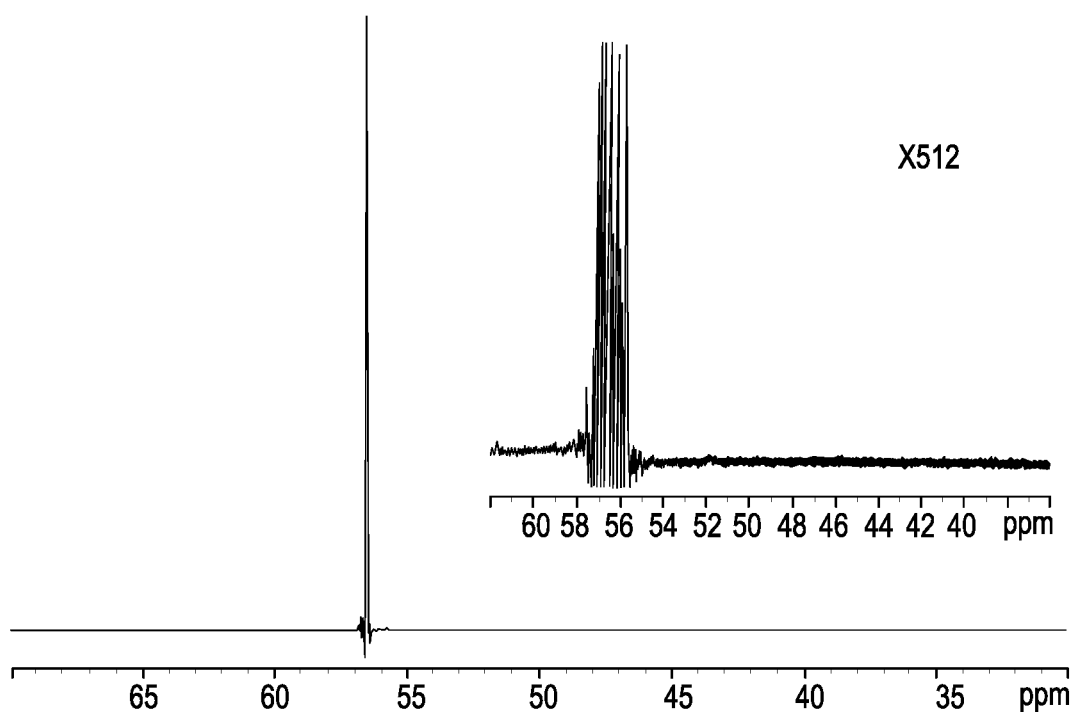
FIG. 3 illustrates a $^{19}F$ NMR spectrum, including a portion of the spectrum magnified 512 times, of the purified HFSI following a second treatment of the purified HFSI of FIG. 2 with ammonia, according to the present disclosure.

The second distillate was analyzed by Fluorine-19 nuclear magnetic resonance spectroscopy and found to include HFSI and no observable fluorosulfonic acid. FIG. 3 shows the $^{19}$F NMR spectrum, as well as an inset portion of the spectrum magnified 512 times to be able to accurately see the peak indicative of fluorosulfonic acid. The peak indicative of fluorosulfonic acid is not present indicating that no residual fluorosulfonic acid was observed, even at 512× magnification of the spectrum.

Aspects

Aspect 1 is a method of producing purified bis(fluorosulfonyl) imide. The method includes providing a liquid mixture including bis(fluorosulfonyl) imide and fluorosulfonic acid; contacting the liquid mixture with gaseous ammonia, wherein the gaseous ammonia reacts with the fluorosulfonic acid to produce ammonium fluorosulfate; and separating the liquid mixture from the ammonium fluorosulfate.

Aspect 2 is the method of Aspect 1, wherein in the providing step, a concentration of the fluorosulfonic acid in the liquid mixture is from about 0.001 mol % to about 70 mol %.

Aspect 3 is the method of Aspect 1 or Aspect 2, wherein contacting the liquid mixture with gaseous ammonia includes introducing the gaseous ammonia a headspace of a vessel containing the liquid mixture.

Aspect 4 is the method of Aspect 3, wherein the gaseous ammonia is supplied at a pressure between about 100 kPa and about 200 kPa.

Aspect 5 is the method of any of Aspects 1-4, wherein contacting the liquid mixture with gaseous ammonia includes bubbling the gaseous ammonia into the liquid mixture.

Aspect 6 is the method of any of Aspects 1-4, wherein contacting the liquid mixture with gaseous ammonia includes flowing the gaseous ammonia and the liquid mixture in a counterflow column.

Aspect 7 is the method of any of Aspects 1-6, wherein separating the liquid mixture from the ammonium fluorosulfate includes filtering the ammonium fluorosulfate from the liquid mixture.

Aspect 8 is the method of any of Aspects 1-6, wherein separating the liquid mixture from the ammonium fluorosulfate includes flash distilling the bis(fluorosulfonyl) imide from the ammonium fluorosulfate.

Aspect 9 is the method of any of Aspects 1-8, wherein a concentration of the bis(fluorosulfonyl) imide in the liquid mixture after separating the ammonium fluorosulfate from the liquid mixture is from about 90 mol % to about 99.95 mol %.

Aspect 10 is the method of any of Aspects 1-9, further comprising:
  providing the liquid mixture after separating the liquid mixture from the ammonium fluorosulfate, the liquid mixture including the bis(fluorosulfonyl) imide and residual fluorosulfonic acid;
  contacting the liquid mixture with gaseous ammonia, wherein the gaseous ammonia reacts with the residual fluorosulfonic acid in the liquid mixture to produce additional ammonium fluorosulfate; and
  separating the liquid mixture from the additional ammonium fluorosulfate.

Aspect 11 is the method of Aspect 10, wherein in the providing step, the concentration of the residual fluorosulfonic acid in the liquid mixture is from about 0.005 mol % to about 20 mol %.

Aspect 12 is the method of Aspect 10 or Aspect 11, wherein contacting the liquid mixture with gaseous ammonia includes introducing the gaseous ammonia a headspace of a vessel containing the liquid mixture.

Aspect 13 is the method of Aspect 12, wherein the gaseous ammonia is supplied at a pressure between about 100 kPa and about 200 kPa.

Aspect 14 is the method of Aspect 10 or Aspect 11, wherein contacting the liquid mixture with gaseous ammonia includes bubbling the gaseous ammonia into the liquid mixture.

Aspect 15 is the method of Aspect 10 or Aspect 11, wherein contacting the liquid mixture with gaseous ammonia includes flowing the gaseous ammonia and the liquid mixture in a counterflow column.

Aspect 16 is the method of any of Aspects 10-15, wherein separating the liquid mixture from the ammonium fluorosulfate includes filtering the ammonium fluorosulfate from the liquid mixture.

Aspect 17 is the method of any of Aspects 10-15, wherein separating the liquid mixture from the ammonium fluorosulfate includes flash distilling the bis(fluorosulfonyl) imide from the ammonium fluorosulfate.

Aspect 18 is the method of any of Aspects 10-17, wherein the bis(fluorosulfonyl) imide concentration in the liquid mixture after separating the additional ammonium fluorosulfate from the liquid mixture is from about 98 mol % to about 99.95 mol %.

Aspect 19 is the method of any of Aspects 10-18, further including distilling the liquid mixture including the bis(fluorosulfonyl) imide and the fluorosulfonic acid before the providing step.

Aspect 20 is the method of Aspect 19, wherein in the providing step, a concentration of the fluorosulfonic acid in the liquid mixture is from about 1 mol % to about 20 mol %.

The invention claimed is:

1. A method of producing purified bis(fluorosulfonyl) imide, the method comprising:
    providing a first liquid mixture consisting of bis(fluorosulfonyl) imide and fluorosulfonic acid;
    contacting the first liquid mixture with gaseous ammonia, wherein the gaseous ammonia reacts with the fluorosulfonic acid to produce a second liquid mixture including ammonium fluorosulfate; and
    separating the ammonium fluorosulfate from the second liquid mixture.

2. The method of claim 1, wherein in the providing step, a concentration of the fluorosulfonic acid in the first liquid mixture is from about 0.001 mol % to about 70 mol %.

3. The method of claim 1, wherein contacting the first liquid mixture with gaseous ammonia includes introducing the gaseous ammonia a headspace of a vessel containing the first liquid mixture.

4. The method of claim 3, wherein the gaseous ammonia is supplied at a pressure between about 100 kPa and about 200 kPa.

5. The method of claim 1, wherein contacting the first liquid mixture with gaseous ammonia includes bubbling the gaseous ammonia into the first liquid mixture.

6. The method of claim 1, wherein contacting the first liquid mixture with gaseous ammonia includes flowing the gaseous ammonia and the first liquid mixture in a counterflow column.

7. The method of claim 1, wherein separating the ammonium fluorosulfate from the second liquid mixture includes filtering the ammonium fluorosulfate from the second liquid mixture.

8. The method of claim 1, wherein separating the ammonium fluorosulfate from the second liquid mixture includes flash distilling the bis(fluorosulfonyl) imide from the ammonium fluorosulfate.

9. The method of claim 1, wherein a concentration of the bis(fluorosulfonyl) imide in a remaining second liquid mixture obtained after separating the ammonium fluorosulfate from the second liquid mixture is from about 90 mol % to about 99.95 mol %.

10. The method of claim 1, further comprising:
    providing a remaining second liquid mixture obtained after separating the ammonium fluorosulfate from the second liquid mixture, wherein the remaining second liquid mixture including the bis(fluorosulfonyl) imide and residual fluorosulfonic acid;
    contacting the remaining second liquid mixture with gaseous ammonia, wherein the gaseous ammonia reacts with the residual fluorosulfonic acid in the remaining second liquid mixture to produce a third liquid mixture including additional ammonium fluorosulfate; and
    separating the additional ammonium fluorosulfate from the third liquid mixture.

11. The method of claim 10, wherein in the providing step, the concentration of the residual fluorosulfonic acid in the remaining second liquid mixture is from about 0.1 mol % to about 20 mol %.

12. The method of claim 10, wherein contacting the remaining second liquid mixture with gaseous ammonia includes introducing the gaseous ammonia a headspace of a vessel containing the remaining second liquid mixture.

13. The method of claim 12, wherein the gaseous ammonia is supplied at a pressure between about 100 kPa and about 200 kPa.

14. The method of claim 10, wherein contacting the remaining second liquid mixture with gaseous ammonia includes bubbling the gaseous ammonia into the remaining second liquid mixture.

15. The method of claim 10, wherein contacting the remaining second liquid mixture with gaseous ammonia includes flowing the gaseous ammonia and the second remaining liquid mixture in a counterflow column.

16. The method of claim 10, wherein separating the additional ammonium fluorosulfate from the third liquid mixture includes filtering the ammonium fluorosulfate from the third liquid mixture.

17. The method of claim 10, wherein separating the additional ammonium fluorosulfate from the third liquid mixture includes flash distilling the bis(fluorosulfonyl) imide from the ammonium fluorosulfate.

18. The method of claim 10, wherein the bis(fluorosulfonyl) imide concentration in a remaining third liquid mixture obtained after separating the additional ammonium fluorosulfate from the third liquid mixture is from about 98 mol % to about 99.95 mol %.

19. The method of claim 10, further including distilling the remaining second liquid mixture including the bis(fluorosulfonyl) imide and the residual fluorosulfonic acid before the providing step.

20. The method of claim 19, wherein in the providing step, a concentration of the fluorosulfonic acid in the remaining second liquid mixture is from about 1 mol % to about 20 mol %.

* * * * *